United States Patent [19]

Frye

[11] Patent Number: 5,275,367
[45] Date of Patent: Jan. 4, 1994

[54] SELF SECURING HOLDING DEVICE AND METHOD

[76] Inventor: Bruce J. Frye, P.O. Box 483, Milltown, Wis. 54853

[21] Appl. No.: 835,333

[22] Filed: Feb. 14, 1992

[51] Int. Cl.$^5$ .................................................. A47F 7/00
[52] U.S. Cl. .............................. 248/205.3; 248/316.7; 248/467; 248/250
[58] Field of Search ............... 248/205.3, 205.4, 467, 248/205.6, 305, 684, 316.7, 250

[56] References Cited

U.S. PATENT DOCUMENTS

| | | | |
|---|---|---|---|
| 3,098,272 | 7/1963 | Frye | 248/205.3 X |
| 3,241,795 | 3/1966 | Frye | 248/205.5 X |
| 3,311,339 | 3/1967 | Frye | 248/205.3 |
| 4,003,538 | 1/1977 | Frye | 248/205.3 X |
| 4,310,137 | 1/1982 | Frye | 248/205.3 X |
| 4,671,480 | 6/1987 | Frye | 248/205.3 |
| 4,706,914 | 11/1987 | Ground | 248/205.3 X |
| 4,756,498 | 7/1988 | Frye | 248/205.3 |
| 4,962,907 | 10/1990 | Gary | 248/205.3 |
| 5,121,896 | 6/1992 | Frye | 248/205.3 X |

Primary Examiner—Karen J. Chotkowski
Attorney, Agent, or Firm—Leo Gregory

[57] ABSTRACT

A reuseable self securing plastic holding device for mounting onto a smooth clean polished surface and having a particular physical arrangement which absorbs and dissipates the sheer forces exerted thereupon by a held object.

8 Claims, 2 Drawing Sheets

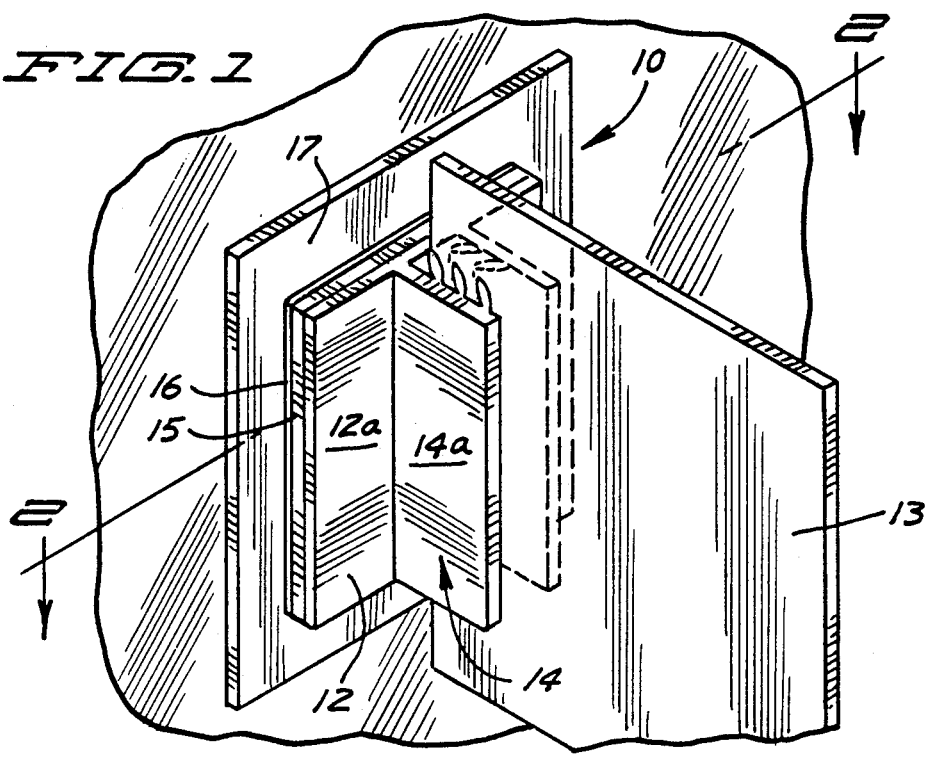
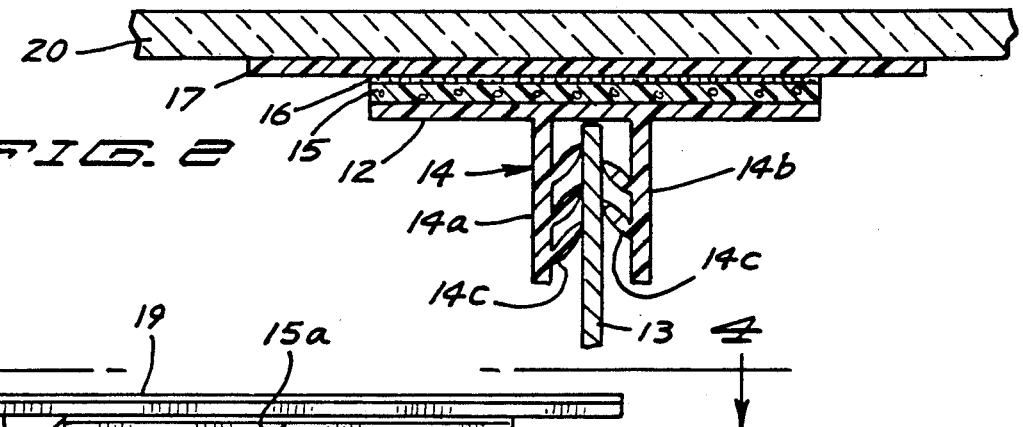
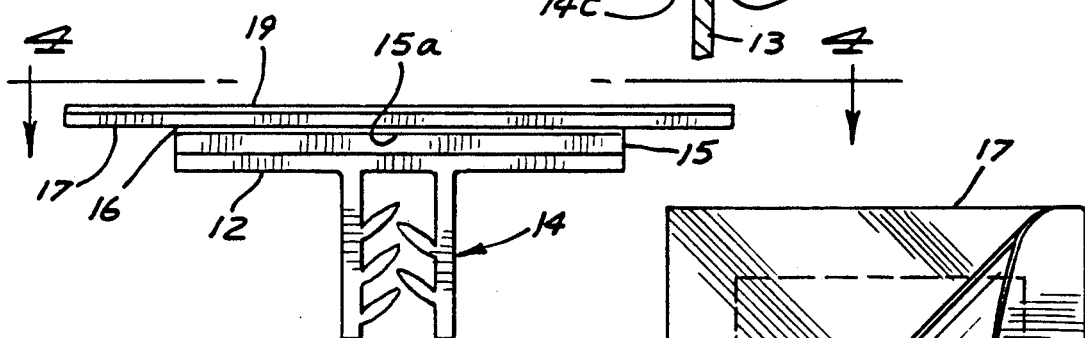
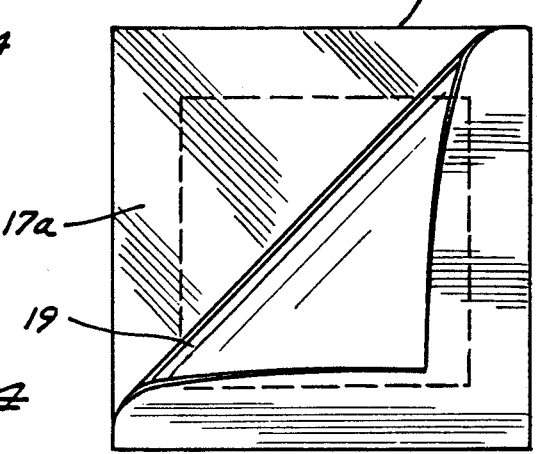

SELF SECURING HOLDING DEVICE AND METHOD

BACKGROUND OF THE INVENTION

1. Field of Invention

This invention relates to a self securing holding device for mounting onto a surface which is reuseable and leaves no residue upon removal.

2. Brief Description of the Prior Art

There are a great many self holding devices for mounting signs on glass or smooth relatively non-porous surfaces.

Early in this development of self securing holding devices or mounts, the inventor herein developed devices which relied for holding capacity upon what has been referred to as molecular adhesion of which examples are his disclosures in his U.S. Pat. Nos. 3,098,272, 2,241,795 and 3,311,339.

It is desirable to improve upon the art as it is known by substantially increasing the relative holding capacity of the mount over what has been experienced in the past by particular innovations in particular details of the structure.

SUMMARY OF THE INVENTION

It is the principal object herein to provide a self securing holding device which requires no adhesive and leaves no residue upon removal and which due to a specific improvement into its physical arrangement results in a great relative increase in holding capacity.

It is another object of the invention herein to provide a structure which tends to absorb and dissipate the sheer force exerted upon the structure by the object mounted thereon or supported thereby.

It is also an object herein to have the pull of the object mounted upon the device remote from the periphery of the holding structure or surface thereof.

It is further an object herein to provide a demountable reusable holding device of which its holding capacity does not diminish with the re-use of the device.

These and other objects and advantages of the invention will be set forth in the following description made in connection with the accompanying drawings in which the reference characters refer to similar parts throughout the several views.

BRIEF OF THE DRAWINGS

FIG. 1 is a view of the device as a whole in perspective having an object mounted thereon;

FIG. 2 is a view in horizontal section taken on line 2—2 of FIG. 1 as indicated;

FIG. 3 is a view similar to that of FIG. 2 in side elevation; and

FIG. 4 is a top plan view of FIG. 3 taken on line 4—4 as indicated and showing the outer surface cover strip being partially peeled away.

DESCRIPTION OF A PREFERRED EMBODIMENT

Figure 5:
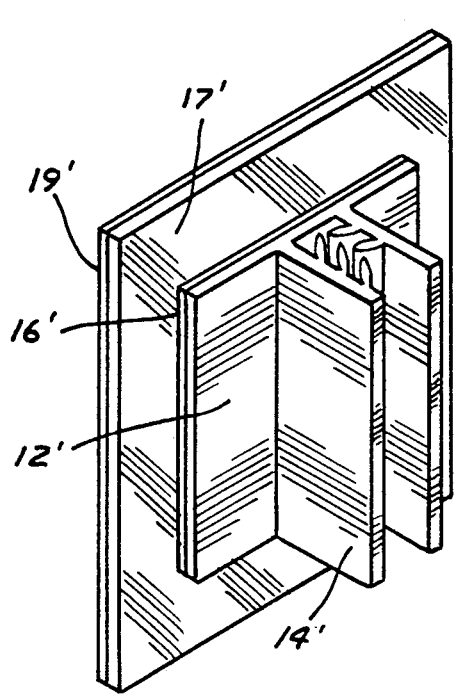
FIG. 5 is a view of the device in perspective showing modification thereof.

Referring to the Figs., a self securing holding device 10 is shown which in the embodiment illustrated comprises an upper body portion 12 formed of a suitably firm fairly rigid plastic material having projecting outwardly of the upper surface 12a thereof a convenient holding member 14 which may be variously formed but is here shown consisting of a pair of upstanding walls 14a and 14b spaced a short distance apart and having inwardly angled interengaging fins 14c which frictionally engage and hold any object disposed therebetween such as the object 13.

Backing said upper body portion 12 to the full extent thereof is a relatively thick compressible cushion layer 15 such as of a plastic foam composition and the same is secured to said upper body portion by a suitable adhesive not here shown or indicated. The thickness of the cushion layer relates to and increases the holding capacity of the device.

Said body portion and said cushion layer have well defined perimeters.

Overlying the bottom surface 15a of said cushion layer and being secured thereto by a suitable adhesive is a thin film layer 16 of polyester which is provided to serve as a barrier as will be described and it may have a thickness on the order of one mil or less. Approximately a one fourth mil in thickness has been found to be very satisfactory.

Overlying said polyester layer and extending beyond and about the perimeters of said upper body portion and said cushion layer is a layer 17 of polyvinyl chloride (PVC) having for purposes herein a durometer count on the order of 65.

Said PVC layer is secured to said layer of polyester by intimate contact from the result of the application of suitable head and pressure and this forms a self securing engagement.

A plasticizer is embodied in said PVC layer and would tend to migrate and thus have an adverse effect on the compressible layer 15 and would eventually in effect dissolve the adhesive which otherwise would be securing the compressible layer to the PVC layer. The polyester film is a very effective barrier which prevents such migration.

Overlying the outer or underlying surface 17a of said PVC layer is another layer 19 of polyester. This layer may very suitably have a thickness on the order of three to five mils. This thickness makes a its removal easier from said PVC layer.

Here again the adhering engagement of the layer 19 is effected by the application of heat and pressure of which found to be suitable are 310° F. of heat and 100 lbs. pressure per square inch. There is another positive effect from this engagement which will now be described.

Layers of PVC are extruded. PVC is a fairly soft material. PVC is well known for its self securing capacity to a smooth holding or supporting surface. Upon being extruded, the outer surface of said PVC layer as seen under a 100 power microscopic lens is a surface having ridges and depressions thereon and this irregular surface adversely affects the natural self securing capacity of the PVC as it reduces the area of holding capacity and prevents the expulsion of all the air thereunder. The PVC is so soft that it is not subject to planishment. However with the application of a layer of polyester to the outer surface of said PVC layer under appropriate heat and pressure and with the polyester layer subsequently peeled away, as seen under said 100 power lens, the PVC surface appears to be so much more event and smooth as the application of heat and pressure appears to have evened out the ridges as if leveling them down to provide a larger area of uniform surface for holding engagement.

As a result, the holding capacity of the PVC layer is increased dramatically and particularly in connection with the structure herein where the PVC layer extends beyond the perimeter of the body portion 12.

The body portion 12 is also an extruded product and the extrusion process does not result in a product having, under magnification, a smooth uniform flat surface.

If the PVC layer were secured directly to the underlying surface of the body portion 12, the irregularities in the surface of the body portion as indicated would be reflected through the PVC layer and thus adversely affect its otherwise self securing holding capacity. Thus the compressible layer 15 is inserted between said body portion 12 and the PVC layer 17 and it in effect absorbs the unevenness of the surface of said body portion whereby said unevenness has no adverse effect on the holding capacity of the PVC layer.

The compressible layer serves another signficant purpose. When an object is mounted onto the device, the object exerts a pull or shear force which in turn exerts a pull on the PVC holding layer. The cushion layer dissipates said sheer force by absorbing it and spreading it throughout its own body out to its perimeter at which point the remaining effect of that force pulls against said PVC layer. However the pull thus exerted is remote from the perimeter of said PVC layer and has relatively little effect on the perimeter holding of said PVC layer.

Now it has been said that PVC holds by molecular adhesion or a natural securing force. However when applied to a supporting surface, it is applied with some pressure and further finger pressure is applied to the portion 17b of the PVC layer extending beyond the outer edge of said body portion 12 and compressible layer 15. Thus an intimate contact is made and sufficient air is exhausted from thereunder to provide a vacuum holding power. When the outer holding surface of the PVC layer was evened out by the application of the polyester layer, it made it possible to better create an environment for a vaccum hold between the PVC layer and a supporting surface 20.

Thus there appears to be a two fold holding capacity comprising the molecular adhesion and the creation of a vacuum in applying the device to a supporting surface, first of course removing the bottom polyester layer 19. The holding capacity has increased so dramatically that it has required the use of a pair of pliers to remove a device by direct pull from a supporting surface. The molecular adhesion may be on the order of a vacuum hold. It is not fully understood.

To reiterate, the force of a load applied to the device is initially absorbed to a significant extent by the cushion layer 15 and it radiates outwardly lessening as it approaches the perimeter of the cushion layer. The outer edges of the PVC layer are fairly remote from the sheer force exerted by the article held as absorbed by the cushion layer and it is very unlikely that the outer edges of the PVC layer would be pulled away from the supporting surface. So long as these edges are intact, the holding effect is maintained. This superior holding capacity of the device has produced very desirable results.

MODIFICATION

Figure 6:
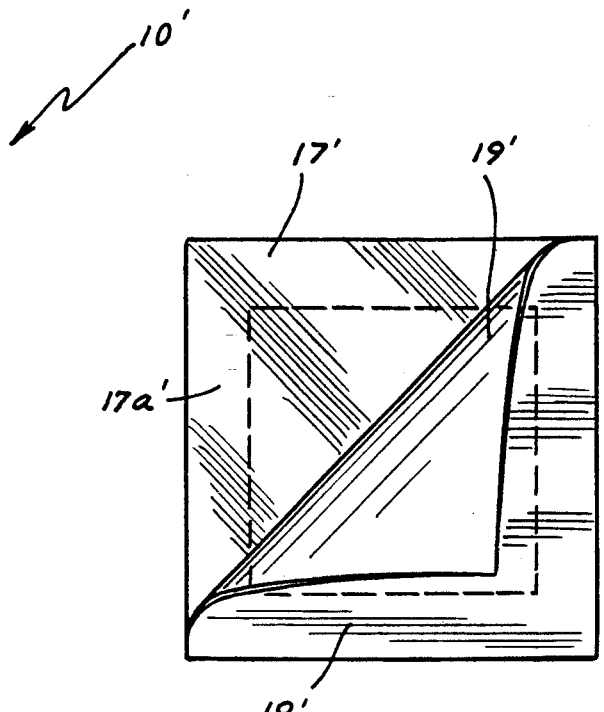
FIG. 6 is a rear plan view of FIG. 5 showing a surface cover strip being peeled away.

Referring to FIGS. 5 and 6, a modification is shown in which like reference numerals refer to like parts with a prime added.

This modified holding device is indicated generally by the reference numeral 10'. The upper body portion 12' thereof and its holding member 14' are as previously described. However the upper body portion does not have an underlying compressible cushion layer but instead directly underlying said body portion 12' is a suitably secured thin layer 16' of polyester and the thickness of this may be on the order of one mil.

Overlying the polyester layer 16' is a layer 17' of polyvinyl chloride (PVC) having a durometer count on the order of 65. This layer of PVC extends beyond and about the perimeter of said body portion 12'.

Removably secured under heat and pressure to the outer bottom surface 17a' of said PVC layer is a cover layer comprising a thin layer of polyester 19' and such a layer having a thickness on the order of one mil as previously described. The application of this layer under appropriate heat and pressure appears to even out the thus engaged surface of said PVC to provide a more effective self securing surface.

What is believed to be the principal factor is providing the device with an unusually effective holding capacity is the extension of said layer of PVC beyond the perimeter of said upper body portion.

MODIFICATION

Figure 7:
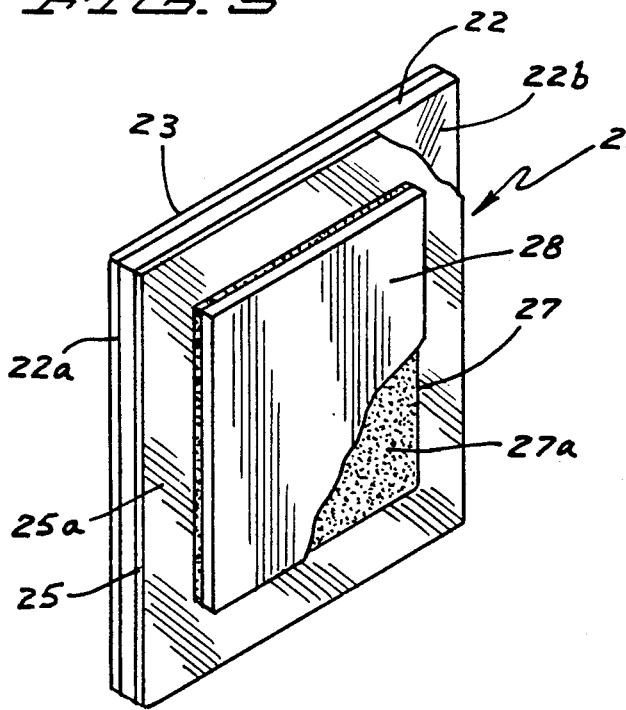
FIG. 7 is a view in perspective showing another modification of the device.
Figure 8:
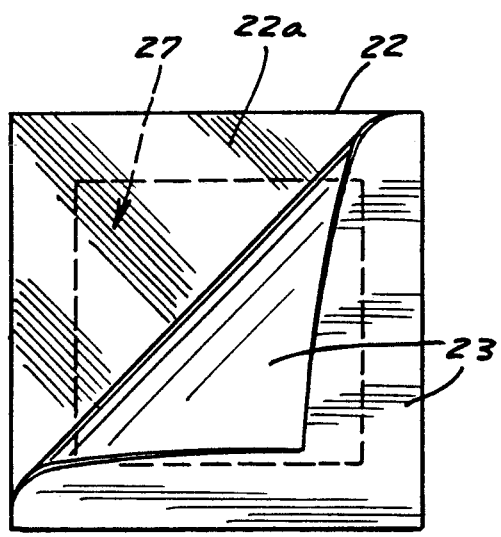
FIG. 8 is a bottom plan view of the device as shown in FIG. 7 with a surface cover strip partially peeled away.

Another modification is present in the device 21 as shown in FIGS. 7 and 8. Here the body portion 22 of the device is a layer of polyvinyl chloride (PVC) of the type as previously described and overlying the outer self holding surface 22a thereof is a removable layer of polyester 23 applied as previously described and preferably having a thickness on the order of three to five mils to be readily removable.

Overlying the other side surface 22b of said PVC layer is thin layer of polyester 25 on the order of one mil in thickness and again this is applied under appropriate heat and pressure to have a very good holding engagement. Thus layer 25 is a barrier layer to prevent the migration therethrough of the plasticizer present in the PVC layer.

Centered onto said polyester layer 25 inset from the periphery thereof and shown as being square in form is an area 27 having an exposed adhesive surface 27a. Extending thereabout is an extended edge portion 25a of said polyester layer.

Protectively covering said adhesive coated surface area is a conventional removable cover strip 28.

The device 21 in being prepared for use, generally will have the self securing surface side of the PVC layer first applied to a smooth fairly non-porous supporting or holding surface, the outer polyester layer 25 having been first removed.

With the other side of said PVC layer having the adhesive inset, almost any kind of an article can be applied thereto to be held by the adhesive surface with the cover strip first being removed. Here a wide range of articles may be removably held.

It will of course be understood that various changes may be made in form, details, arrangement and proportions of the parts without departing from the scope of the invention herein which, generally stated, consists in an apparatus capable of carrying out the objects above set forth, in the parts and combination of parts disclosed and defined in the appended claims.

What is claimed is:

1. A self securing holding device, having in combination
a firm upper layer portion having an article holding means thereon,
a cushion layer underlying said upper layer portion,
a barrier layer adapted to block the migration of plasticizer underlying said cushion layer,
said mentioned layers having identical perimeters, and
a self securing layer of a fairly soft durometer count of polyvinyl chloride at one side underlying and extending beyond and about the perimeters of said prior mentioned layers and having an intimate secured engagement with said barrier layer.

2. Said structure of claim 1, wherein
said self securing layer having an underlying surface at its other side,
a film of polyester being appropriately applied to said underlying exposed surface of said self securing layer leaving a more even surface upon its removal therefrom.

3. The structure of claim 1, wherein
said barrier layer comprises a film of polyester.

4. The structure of claim 1, wherein
said self securing layer comprises a layer of polyvinyl chloride.

5. The structure of claim 1, wherein
said cushion layer is of such thickness as to absorb all irregularities present in the overlying surface of said upper portion layer and having a flat uniform underlying surface.

6. The structure of claim 1, wherein
said cushion layer is of a plastic foam composition.

7. A self securing holding device, having in combination
a firm upper body portion layer having an article holding means thereon and having an underlying exposed surface,
a cushion layer underlying and secured to said exposed underlying surface of said upper body portion layer,
said upper body portion and said cushion layers having well defined perimeters,
a film-like plasticizer barrier layer underlying said cushion layer,
a self securing layer of polyvinyl chloride having a durometer count on the order of 65 underlying said barrier layers and extending beyond and about the perimeters of said first and second mentioned layers,
said self securing layer having an underlying surface, and
a film of polyester appropriately removably applied to said underlying surface of said self securing layer and causing said surface to become more uniform.

8. A self securing holding device, having in combination
a self securing layer of a fairly soft polyvinyl chloride having an upper and a lower surface,
a barrier film of polyester overlying said upper surface of said self securing layer,
an article holding means centrally of said barrier film and suitably secured thereto,
a layer of polyester appropriately removably secured to and overlying said lower surface of said self securing layer,
said barrier film being on the order of one mil or less in thickness, and
said layer of polyester being on the order of three to five mils in thickness.

* * * * *